(12) United States Patent
Jokschas et al.

(10) Patent No.: US 8,770,415 B2
(45) Date of Patent: Jul. 8, 2014

(54) FILTER ELEMENT FOR A LIQUID FILTER

(75) Inventors: Guenter Jokschas, Murrhardt (DE); Uwe Scherle, Reisbach (DE); Dusan Franclik, Trebic (CS)

(73) Assignee: Mann + Hummel GmbH, Ludwigsburg (DE)

( * ) Notice: Subject to any disclaimer, the term of this patent is extended or adjusted under 35 U.S.C. 154(b) by 0 days.

(21) Appl. No.: 11/444,311

(22) Filed: Jun. 1, 2006

(65) Prior Publication Data

US 2006/0278575 A1    Dec. 14, 2006

(30) Foreign Application Priority Data

Jun. 1, 2005   (DE) .......................... 20 2005 008 680

(51) Int. Cl.
*B01D 35/30*   (2006.01)
*B01D 29/07*   (2006.01)
*B01D 35/00*   (2006.01)

(52) U.S. Cl.
USPC ........ 210/493.2; 210/443; 210/444; 210/450; 210/451; 210/455

(58) Field of Classification Search
USPC ............... 210/443, 444, 493.2, 450, 451, 455
See application file for complete search history.

(56) References Cited

U.S. PATENT DOCUMENTS

| 3,235,084 | A | * | 2/1966 | King et al. | 210/149 |
| 4,814,078 | A | * | 3/1989 | Stern et al. | 210/282 |
| 4,824,564 | A | * | 4/1989 | Edwards et al. | 210/232 |
| 4,956,089 | A | * | 9/1990 | Hurst | 210/484 |
| 5,022,986 | A | * | 6/1991 | Lang | 210/94 |
| 5,078,877 | A | * | 1/1992 | Cudaback et al. | 210/315 |
| 5,733,452 | A | * | 3/1998 | Whitlock | 210/497.01 |
| 5,817,234 | A | * | 10/1998 | Dye et al. | 210/232 |
| 5,858,227 | A | * | 1/1999 | Stone et al. | 210/234 |
| 5,891,337 | A | * | 4/1999 | Keller et al. | 210/443 |
| 6,110,368 | A | * | 8/2000 | Hopkins et al. | 210/497.1 |
| 6,187,188 | B1 | * | 2/2001 | Janik et al. | 210/232 |
| 6,500,335 | B2 | * | 12/2002 | Janik et al. | 210/232 |

FOREIGN PATENT DOCUMENTS

DE    44 44 934 A1    6/1996

* cited by examiner

*Primary Examiner* — Nam Nguyen
*Assistant Examiner* — Madeline Gonzalez
(74) *Attorney, Agent, or Firm* — James Hasselbeck

(57) ABSTRACT

A filter element for a liquid filter, especially a fuel filter, having an annular, rotationally symmetrical filter medium closed on at least one axial end by an end disk to sealingly separate an exterior space surrounding the the filter medium from an interior space inside the filter medium, with a connecting opening provided in the end disk such that the opening is arranged eccentrically of the axis of the filter medium, and a filter system in which such a filter element is disposed.

12 Claims, 3 Drawing Sheets

FILTER ELEMENT FOR A LIQUID FILTER

BACKGROUND OF THE INVENTION

The present invention relates to a filter element for a liquid filter comprising a substantially annular, rotationally symmetrical filter medium which is closed by an end disk to provide a seal at the end face and to a fuel filter incorporating such a filter element.

Filter elements of this type are used for filtering liquids in places where the available installation space is limited. For this purpose, the filter elements must be adapted to the spatial conditions. Published German patent application no. DE 44 44 934, for example, discloses a hollow cylindrical fuel filter element that is installed in a filter housing. The filter element communicates with a filter head on which are disposed an inlet and an outlet fitting. The fuel outlet fitting penetrates the end disk in the center and is releasably connected therewith so as to form a seal. The fuel inlet fitting is disposed off center. A drawback is that a major part of the surface of the filter head is taken up by the arrangement of the two fittings. As a result, the adaptability of the filter head to the limited spatial conditions is severely restricted. Moreover, the filter head itself offers little room for mounting add-on elements, such as sensors or heating connections.

SUMMARY OF THE INVENTION

It is an object of the invention to provide an improved liquid filter element which overcomes the aforementioned drawbacks.

Another object of the invention is to provide a filter element which is particularly suitable for use in liquid filters where installation conditions are tight.

A further object of the invention is to provide a liquid filter that is economical to manufacture.

An additional object of the invention is to provide a liquid filter element that is simple to install.

These and other objects are achieved in accordance with the present invention by providing a filter element for a liquid filter comprising a substantially annular, rotationally symmetrical filter medium closed on at least one axial end by an end disk to seal the end face and separate an exterior space outside the filter medium from an interior space inside the filter medium, wherein the end disk has an opening which is disposed off-center relative to the axis of the filter medium.

The filter element according to the invention comprises an annular, rotationally symmetrical filter medium, which is tightly closed by an end disk, at least at one end face. To produce a tight connection, the filter medium is, for example, welded, bonded or vulcanized to the end disk. As a result, the end disk separates an exterior side on the outside of the filter medium from an interior side within the filter medium.

The end disk is made of synthetic resin material (i.e., plastic) in an original forming process and has an opening that serves as an inlet or an outlet for a liquid stream. In accordance with the invention, this opening is disposed outside the filter element's axis of symmetry and may extend directly to the radial margin of the hollow cylinder. In the assembled state, the opening communicates with a connecting contour of a filter housing or a filter head. This may, for example, be a pipe fitting or nipple which protrudes through the opening into the end disk. The advantage of this arrangement is that a large space is created in the center of the filter element and the filter head communicating therewith. As a result, additional elements may be mounted to the filter head, or the filter head may be better integrated into a tight installation space.

According to one advantageous embodiment of the invention, a pipe fitting is provided on the end disk, which communicates with the end disk. The pipe fitting protrudes beyond the end disk along the longitudinal axis of the end disk and is provided to create a connection with the connecting contour of the filter head. This pipe fitting may, for example, be made of a thermoplastic or an elastomer and may be snapped, welded, fitted or bonded into the opening of the end disk. The pipe fitting may also be integrally manufactured together with the end disk in an original forming process. To create a seal, elastomer rings may be disposed between the filter head and the pipe fitting. To mount the filter element, the pipe fitting is inserted into a connecting contour formed on the filter head, so that a tight connection is produced. With the pipe fitting disposed on the end disk, a simple and reliable assembly is advantageously made possible. In addition, the configuration of the communicating filter head is simplified.

According to another advantageous embodiment of the invention, the pipe fitting is radially displaced along its further course. This makes it possible to radially extend an end-face extension of the pipe fitting relative to the connecting contour up into the annular area of the filter medium or beyond it. As a result, the connecting contour of the filter element may be arranged even further off center to improve the adaptability to the spatial installation situation.

Yet another advantageous embodiment provides that the end disk be made of a plurality of layers. One layer may be made of an elastomer, for example, which is embedded into the end face of the filter medium and closes it to form a seal. This first end disk terminates in a planar surface with the end face of the filter medium. The opening and the pipe fitting, which serve to connect the connecting contour of the filter element, may be disposed in a second end disk. The second end disk may, for example, be made of a thermoplastic, such as polyamide or polypropylene. On this second end disk may be arranged the opening and the fitting that serves to connect the connecting contour to the filter head. The two end disks may be interconnected by one of the above-described methods. This has the advantage of making use of the different material properties of the individual end disks. For example, an elastic material can provide a reliable seal relative to the filter medium and a mechanically rigid material can be used to form the pipe fitting and the connecting opening.

According to yet another embodiment of the invention, one end disk is made of a thermoplastic material. Polyamide or polypropylene may, for instance, be used for this purpose. These materials can be easily and economically produced in the required geometries and have the necessary excellent chemical, thermal and mechanical stability.

In yet another advantageous embodiment of the invention, resin-reinforced rubber is used to form one end disk. The resin-reinforced rubber, such as nitrile rubber, for example, may be vulcanized to the end face of the filter medium. To improve adhesion and stability, epoxy resin or phenol resin may also be added to the rubber. In the above-described variant with a plurality of end disks, this connection to the second end disk is achieved through the vulcanization process. To this end, contours or surfaces that optimize an interlocking with the rubber end disk may be formed on the second end disk. Advantageously, the rubber end disk enables an elastic, reliable connection to the filter medium, which is simple and economical to produce and is chemically resistant even to fuels, such as gasoline, diesel and rape methyl ester (RME).

In yet another advantageous embodiment, contours are disposed on the end disk to ensure centering within the filter housing. These contours protrude radially and/or axially beyond the end disk and support the filter element in its assembled state relative to an outer wall or relative to a corresponding guiding contour of a filter head. These contours may also be dimensioned to simultaneously provide axial support, particularly relative to a filter head. This configuration is particularly advantageous because, unlike conventional filter elements, the filter element according to the invention has no central opening in the end disk. The contours may be configured in such a way that they simultaneously facilitate assembly and axially and radially support the filter element.

The invention further relates to a fuel filter in which the described filter element of the invention is arranged. The filter element is disposed in a cup-shaped housing, which is releasably or non-releasably connected to a filter head at one open end face. The filter head has a connecting contour serving as a fuel outlet, which communicates with the opening of the filter element. In addition, a fuel inlet is disposed on the filter head, through which the fuel flows to the outside of the filter element. Both the fuel inlet and the fuel outlet may be disposed off center in the filter head. This minimizes the space required for the necessary connections of the filter head, so that the fuel filter can be accommodated in spatially tight installation situations.

According to yet another advantageous embodiment of the invention, the space that becomes available on the filter head is used to mount optional add-on units directly on the filter head. These add-on units may, for example, be a fuel heating unit, sensors or a return flow connection.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
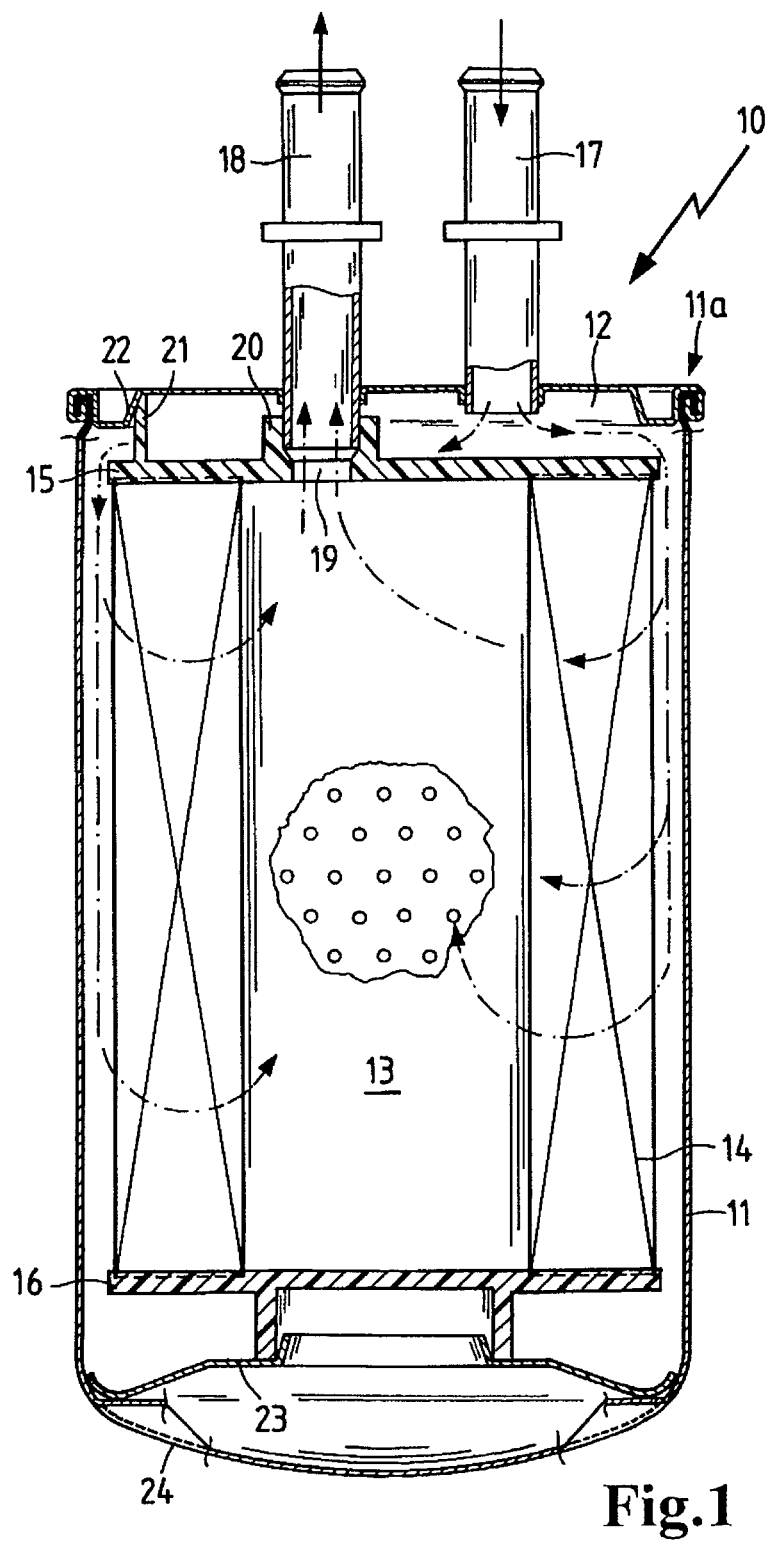
FIG. 1 is a sectional side view of a fuel filter unit with a filter element according to the invention disposed therein.
Figure 2:
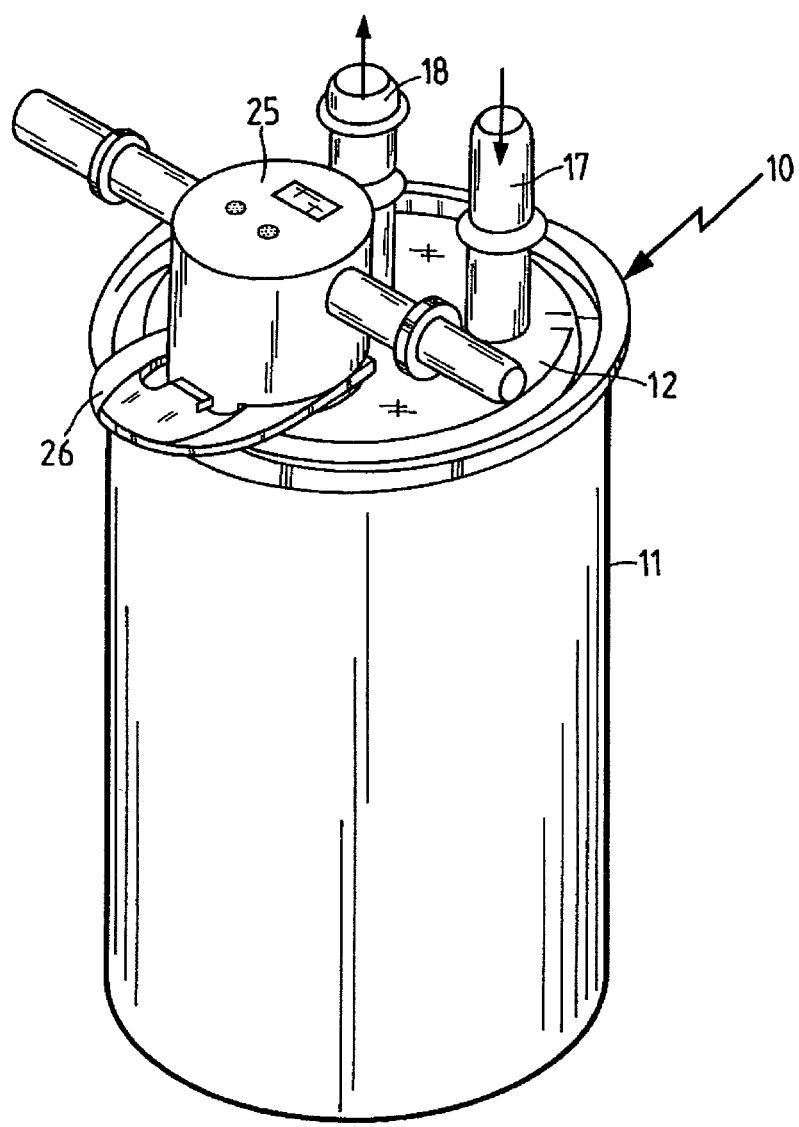
FIG. 2 is a perspective view of the fuel filter element of the invention with an integrated add-on unit.

FIG. 1 shows a fuel filter 10 in which a filter element 13 is arranged between a filter cup 11 and a filter head 12. The filter element 13 consists of an annular filter medium 14, which is sealingly connected at its two end faces to an open end disk 15 and a closed end disk 16. The filter cup 11 is sealingly connected to the filter head 12 by a turned-over edge.

The filter head 12 has an inlet fitting 17 through which the fuel flows in. In its further course the fuel flows out of the filter element 13 again, through an outlet fitting 18. The filter medium 14 is annular and forms a hollow cylindrical space in the center. An off-center opening 19, through which the filtered fuel flows into the outlet fitting 18, is disposed in the open end disk 15.

Concentrically to the opening 19 the open end disk 15 has a pipe fitting 20 that protrudes over the end disk 15 along the end face. This pipe fitting 20 communicates with the outlet fitting 18 such that the outlet fitting 18 can be inserted into the pipe fitting 20. This produces a tight connection between the pipe fitting 20 and the outlet fitting 18.

The open end disk 15 moreover has a plurality of support contours 21, which support the filter element 14 relative to a support bead 22 disposed on the filter head. The support contours 21 are web-shaped and have a certain elasticity, so that the filter element 14 is axially supported relative to the filter head 12 and radially centered. To ensure axial pressure of the filter element 14 relative to the filter head 12, a spring element 23, preferably made of spring steel sheet, is disposed between the bottom 24 of the cup 11 and the closed end disk 16.

Figure is a perspective view of the fuel filter 10. Components corresponding to those shown in FIG. 1 are identified by the same reference numerals. As clearly shown in the figure, the inlet fitting 17 and the outlet fitting 18 are arranged off center on the filter head 12. The space available on the end face of the filter head 12 is used to arrange an add-on element 25.

In the example shown, the add-on element 25 is a fuel heating unit, which communicates with the interior of the fuel filter. This add-on element 25 is releasably fastened to the fuel filter 10 by a clamp 26 and remains on the vehicle during servicing or is refastened when the fuel filter 10 is replaced.

Figure 3:
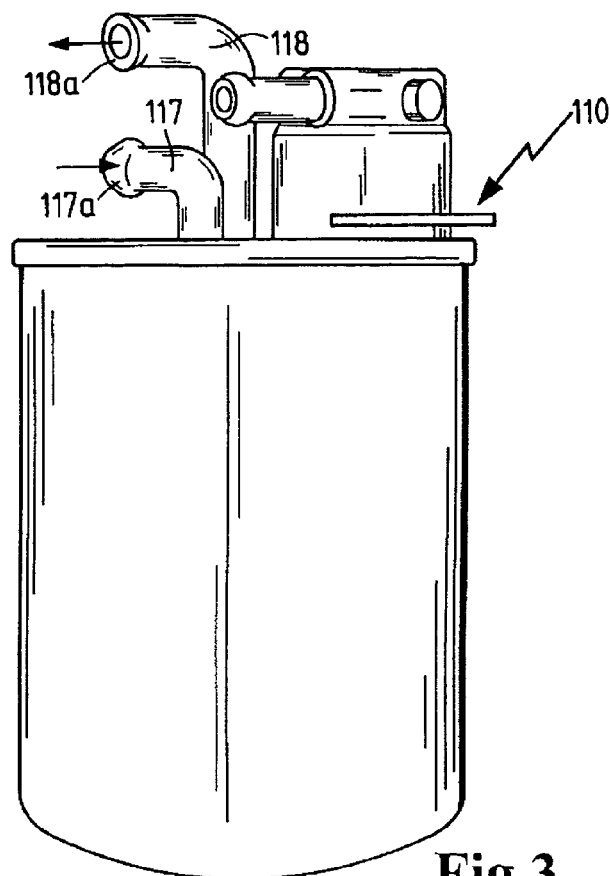
FIG. 3 is a view of a variant filter head with a modified connection fitting.

FIG. 3 shows the fuel filter 110 with a modified outlet fitting. The inlet fitting 117 and the outlet fitting 118 are angled at approximately 90 degrees to the filter axis. At their openings, these two fittings 117, 118 have connecting beads 117a, 118a to facilitate secure connections to connecting hoses (not shown).

Figure 4:
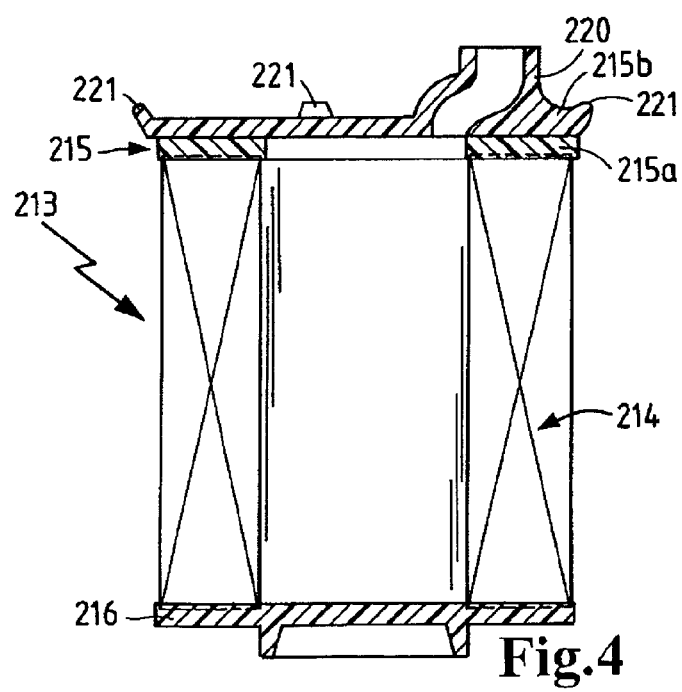
FIG. 4 is a sectional view of a modified filter element variant according to the invention.

FIG. 4 is a sectional schematic view of yet another embodiment of a hollow-cylindrical filter element 213. A filter medium 214 is connected to a closed end disk 216 and an open end disk 215 at its two end faces so as to form a seal. The open end disk 215 a/b comprises a first layer 215a in which one end face of the filter medium 214 is embedded. This first layer 215a is firmly and sealingly connected to the second layer 215b—e.g., by bonding or welding.

The second layer 215b is made, for example, of a thermoplastic material and is more rigid than the first layer 215a. This makes it possible to dispose a pipe fitting 220, which communicates with a filter head (not shown) in the assembled state, on the second end disk 215b. The second layer 215b moreover has support contours that protrude over the filter medium 214, center the filter element 213 in a filter cup (not shown) and simultaneously support it axially relative to the filter head.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element configured for installation into a filter housing of a liquid filter, said filter housing having a filter cup and a filter head, said filter element comprising a substantially annular, rotationally symmetrical filter medium closed on at least one axial end by an end disk to seal an axial end face and separate an exterior space outside the filter medium from an interior space inside the filter medium, wherein the end disk has a fluid flow opening which is disposed off-center relative to the axis of the filter medium;

wherein the end disk comprises
- a first end disk layer having an axial outer face and an axial inner face, the axial end face of the filter medium securely embedded into the axial inner face of the first end disk layer, the first end disk layer forming an elastic sealing layer abutting the axial end face of the filter medium;
- a second end disk layer having an axial inner face arranged directly on and covering the axial outer face of the first end disk layer, the axial inner face of the second end disk layer sealing and firmly secured to the axial outer face of the first end disk layer;
- wherein the first and second end disk layers form overlaid layers of a multi-layered end disk;
- wherein the second end disk layer is more mechanically rigid than the first end disk, the second end disk layer defining a fitting formed integrally therewith, the fitting formed on the axial outer face of the second end disk layer and having a bore extending completely through the multi-layered end disk into the interior space of the filter medium;
- wherein each of the end disk layers having chemical, mechanical and thermal properties optimized for a different selected function;

wherein said bore of said fitting of said end disk is in fluid flow communication with said interior space of said filter medium through said opening;

wherein said fitting is axially spaced apart from said filter housing; and wherein the axial outer face of the second end disk layer includes centering contours for centering, said centering contours extending axially outwardly away from the axial outer face of said end disk in a direction away from said filter medium and configured to engage with the filter head of the filter housing to axially support the filter element within the filter housing.

2. A filter element according to claim 1, wherein the fitting protrudes axially beyond the filter medium and said fitting defines a radial displacement along its further course.

3. A filter element according to claim 1, wherein the end disk comprises a plurality of layers having mechanical and chemical properties optimized for one of chemical resistance, structural rigidity, and vibration resistance.

4. A filter element according to claim 3, wherein at least one end disk is made of a thermoplastic material.

5. A filter element according to claim 3, wherein at least one layer of the end disk is made of resin-reinforced rubber.

6. A fuel filter having a filter element according to claim 1 disposed within a cup-shaped filter housing that is connected to a filter head, wherein said filter head is secured to said cup shaped housing defining a closed chamber into which said filter element is arranged;

said fuel filter further comprising a tubular pipe having a first portion arranged within said filter housing and secured at a first end to said fitting, said tubular pipe having a second portion secured to and configured to deliver fluid flow through said filter head to an outside of said filter head, said tubular pipe operable to deliver fluid flow from said interior space of said filter medium to said outside of said filter head.

7. A fuel filter according to claim 6, wherein an add-on unit is disposed on the filter head and communicates with the outside of the filter medium through a functional opening.

8. A fuel filter comprising:
- a filter housing including a filter head;
- a filter element for filtering a liquid;
- a substantially annular, rotationally symmetrical filter medium closed on at least one axial end;
- an end disk disposed at the at least one axial end to seal the axial end and separate an exterior space outside the filter medium from an interior space inside the filter medium, the end disk having an opening disposed off-center relative to the axis of the filter medium, the end disk comprising
  - a first end disk layer having an axial outer face and an axial inner face, an axial end face of the filter medium securely embedded into the axial inner face of the first end disk layer, the first end disk layer forming an elastic sealing layer abutting the axial end face of the filter medium;
  - a second end disk layer having an axial inner face arranged directly on and covering the axial outer face of the first end disk layer, the axial inner face of the second end disk layer sealing and firmly secured to the axial outer face of the first end disk layer;
  - wherein the first and second end disk layers form overlaid layers of a multi-layered end disk;
  - wherein the second end disk layer is more mechanically rigid than the first end disk, the second end disk layer defining a fitting formed integrally therewith, the fitting formed on the axial outer face of the second end disk layer and having a bore extending completely through the multi-layered end disk into the interior space of the filter medium;
- wherein the layers are sealingly bonded together, each of the layers having chemical, mechanical and thermal properties optimized for a different selected function;
- wherein said fitting of said end disk has a bore in fluid flow communication with said interior space of said filter medium;
- wherein said fitting is axially spaced apart from said filter housing;
- an electrical add-on unit disposed on the filter head, communicating with outside of the filter medium through a functional opening;
- wherein said end disk includes centering contours for centering, extending axially outwardly away from the axial outer face of said end disk in a direction away from said filter medium and engage with the filter head to axially support the filter element within the filter housing.

9. The fuel filter according to claim 8, wherein the electrical add-on unit comprises at least one of a sensor and a heater.

10. The filter element according to claim 1, wherein said interior space is totally enclosed by said filter medium together with said end disk, said interior space opening only into said bore of said fitting.

11. The fuel filter according to claim 8, wherein said interior space is totally enclosed by said filter medium together with said end disk, said interior space opening only into said bore of said fitting.

12. The fuel filter according to claim 11, wherein said fitting protrudes axially beyond the filter medium and said fitting defines a radial displacement along its further course.

* * * * *